United States Patent [19]
Covell

[11] Patent Number: 5,865,403
[45] Date of Patent: Feb. 2, 1999

[54] MOUNTING BRACKET FOR DASH MOUNTABLE MARINE ELECTRONICS

[75] Inventor: Kevin Scott Covell, Tulsa, Okla.

[73] Assignee: Lowrance Electronics, Inc., Tulsa, Okla.

[21] Appl. No.: 529,358

[22] Filed: Sep. 18, 1995

[51] Int. Cl.⁶ .................................................. G12B 9/00
[52] U.S. Cl. ...................................................... 248/27.1
[58] Field of Search .................................. 248/27.1, 27.3, 248/228.3, 231.41, 222.14, 224.8, 225.11, 298.1, 299.1, 316.8

[56] References Cited

U.S. PATENT DOCUMENTS

| | | | |
|---|---|---|---|
| 2,734,708 | 2/1956 | Cohn | 248/299.1 X |
| 2,766,955 | 10/1956 | Dallimonti | 248/27.1 |
| 2,855,167 | 10/1958 | Christophersen | 248/27.1 |
| 3,589,656 | 6/1971 | Protzmann | 248/27.1 |
| 3,765,628 | 10/1973 | Wilson | 248/27.1 |
| 4,293,895 | 10/1981 | Kristofek | 248/27.1 X |
| 4,572,465 | 2/1986 | Rasca | 248/27.1 |
| 4,577,818 | 3/1986 | Clarisse | 248/27.3 |
| 4,738,420 | 4/1988 | Angle et al. | 248/27.1 |
| 5,106,039 | 4/1992 | Gross | 248/27.1 |
| 5,320,311 | 6/1994 | Jensen et al. | 248/27.1 |
| 5,467,947 | 11/1995 | Quilling, II | 248/27.1 |

*Primary Examiner*—Leslie A. Braun
*Assistant Examiner*—Anita M. King
*Attorney, Agent, or Firm*—Bell Seltzer Intellectual Property Group of Alston & Bird, LLP

[57] ABSTRACT

A mounting assembly for securely mounting a dash instrument within a corresponding aperture of a dashboard. The mounting assembly comprises one or more mounting brackets mounted to the instrument and positioned against the rear side of the instrument panel to securely mount the instrument to withstand forces typically experienced by fast moving vehicles such as boats. The mounting brackets each comprise a slot defined therein which divides the bracket into two regions, a first of which provides a tapered portion. A connector extends through the slot and into a corresponding aperture of the instrument so as to contact only one side of the slot of the mounting bracket. Thus, when the connector is rotated to be tightened, the frictional forces between the connector and the mounting bracket include a force component in a direction which drives a larger segment of the tapered portion between the connector and the rear side of the dashboard, thereby drawing the dash instrument into the corresponding aperture defined by the dashboard.

9 Claims, 3 Drawing Sheets

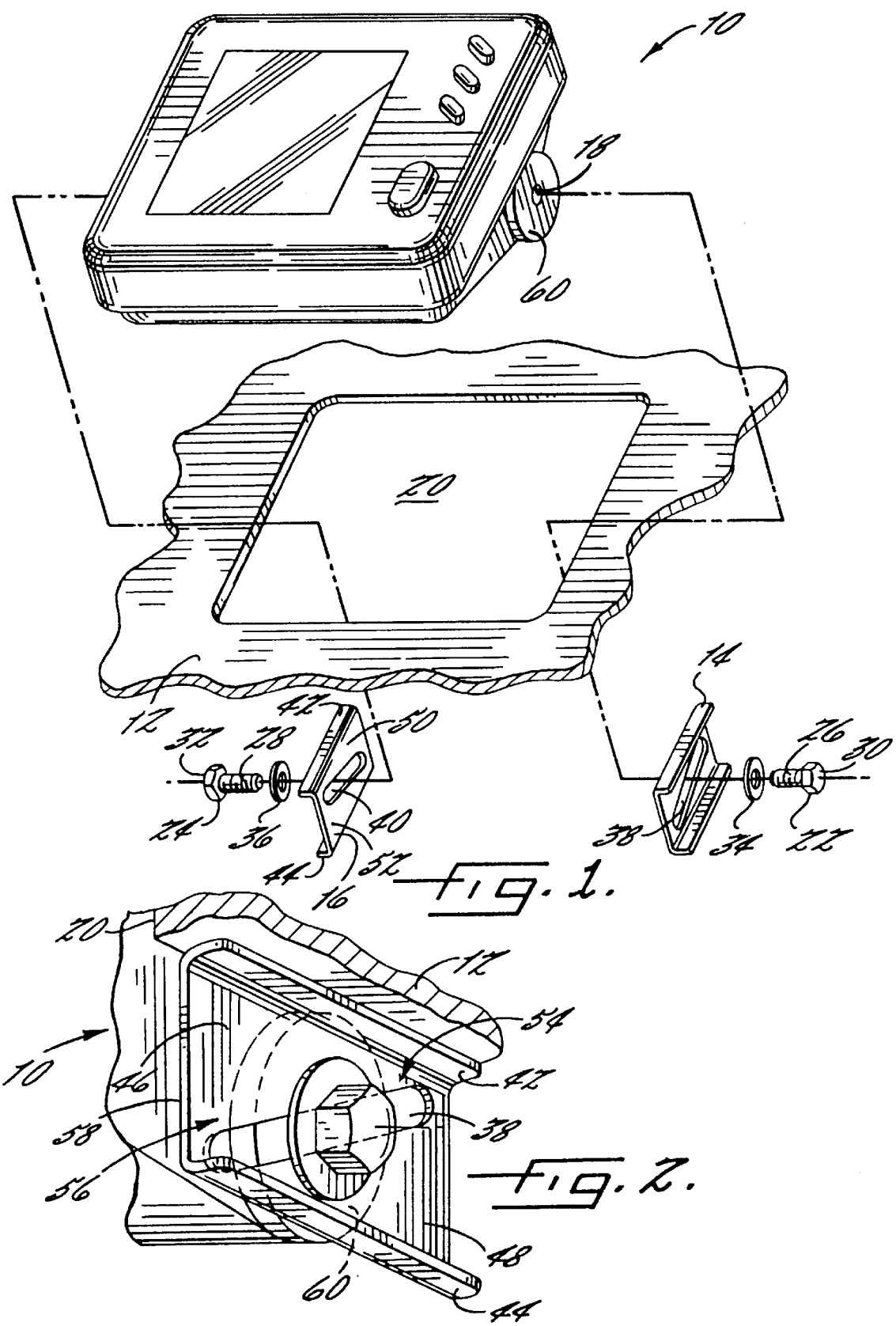

MOUNTING BRACKET FOR DASH MOUNTABLE MARINE ELECTRONICS

FIELD OF THE INVENTION

The present invention relates to a bracket for securely mounting an instrument within an instrument panel. The present invention has particular applicability for mounting a display screen or other instrument within a dashboard, such as a dashboard of a boat.

BACKGROUND OF THE INVENTION

Instruments mounted within instrument panels of vehicles, such as boats, must be securely mounted to withstand the harsh conditions to which they may be subjected. The importance of securely mounting instruments within an instrument panel is particularly apparent for fast-moving vehicles which typically subject the instruments to even greater forces. In terms of boats, the instruments must withstand substantial forces acting on the instrument and the instrument panel resulting from choppy or rough water conditions. Furthermore, forces resulting from acceleration and deceleration of the boat may also produce substantial forces on either or both the instrument or the instrument panel. Often times, these forces are cyclical, particularly when the forces affecting the instrument and instrument panel are due to deceleration and acceleration forces.

The forces acting on the instrument and the instrument panel tend to loosen the mounting of the instrument within the instrument panel. Moreover, once an instrument begins to loosen, the instrument will tend to continue to loosen since the instrument will experience greater relative motion with respect to the instrument panel. The loosening of the instrument may impair the performance of the instrument and, more typically, may structurally damage the instrument and/or the instrument panel due to the relative motion therebetween.

Accordingly, it is necessary to securely mount the instruments within the instrument panel to withstand these varying and often times harsh conditions. The mounting mechanism securing the instrument to the instrument panel must thereby be mechanically stable to prevent relative movement between the instrument and the instrument panel regardless of the conditions experienced by the boat. As will be apparent, the more firmly that the instrument is secured within the instrument panel, the more durable and reliable will be the instrument. Yet, the mounting used to secure the instrument is preferably economical, lightweight and relatively easy to manufacture and install.

The mounting mechanism must also be easily accessible to service the instrument. This requirement is particularly important in light of the limited access provided by the confined space behind a dashboard, such as the dashboard of a boat. Moreover, once access is achieved, the mounting mechanism should permit easy removal and/or repair of the instrument.

SUMMARY OF THE INVENTION

It is, thus, an object of the present invention to provide a mounting bracket which will firmly secure the instrument within the instrument panel.

It is a further object of the present invention to provide a mounting bracket which is inexpensive and easily manufactured.

It is yet another object of the present invention to provide a mounting bracket which is lightweight.

It is a still further object of the present invention to provide a mounting bracket which can be readily assembled and disassembled such that the instrument can be easily installed and can be readily removed from the instrument panel for servicing.

The mounting bracket of the present invention achieves these and other objects by providing a mounting assembly and associated method for firmly mounting an instrument, such as a display screen, in an aperture defined within an instrument panel, such as the dashboard of a boat. In one embodiment, the mounting assembly includes first and second mounting brackets which are disposed on opposite sides of the instrument, and which are positioned on the rear side of the dashboard. Each mounting bracket possesses a slot which is angularly positioned relative to the bracket to thereby divide the mounting bracket into first and second regions. The first region of each mounting bracket is disposed between the slot and the rear side of the dashboard and has a predetermined shape which tapers from a first narrow portion to a second broad portion.

In one embodiment, the mounting brackets are positioned in alignment with respective apertures of the instrument. The mounting assembly of this embodiment can also include first and second connectors comprising a head portion and a shank portion. The connectors preferably have a width smaller than the slot such that the connectors can extend through a slot defined by a respective mounting bracket and into the respective aperture of the instrument. The connectors can then be rotated relative to the respective mounting brackets.

With this arrangement, the selectively configured mounting bracket can be appropriately positioned to drive the broader portion of the bracket between the connector and the rear side of the dashboard, thereby driving a wedge between the two members to produce a more secure fit. This secure fit is achieved by rotating the connector in a first rotational direction which will thereby move the mounting bracket relative to the dashboard so as to force a greater wedge between the connector and the rear side of the dashboard. This wedging action thereby draws the dash instrument further into the aperture defined by the dashboard, resulting in a sturdy connection.

In another embodiment, first and second posts may extend outwardly from opposite sides of the dash instrument. Mounting brackets, such as described above, can be positioned about the respective posts so that the posts are received within a respective slot of the mounting brackets. In this embodiment, connecting members may then engage the post extending outwardly from the dash instrument such that subsequent rotation of the connecting members move the mounting bracket relative to the dashboard and drive a larger wedge therebetween such that the dash instrument is securely mounted to the dashboard.

The mounting assembly of the various embodiments of the present invention thereby provides one or more mounting brackets having a wedge shaped portion which can be driven by the rotation of a connector further between the connector and the rear side of the dashboard to tightly pull the instrument within a corresponding aperture defined by the dashboard. The mounting bracket according to the various embodiments is a unitary structure which may be easily and inexpensively manufactured. Moreover, the structure of the lightweight mounting bracket permits easy removal by merely untightening the connector. Thus, only minimal access to the mounting assembly of the present invention must be provided in order to assemble or disassemble the mounting assembly.

BRIEF DESCRIPTION OF THE DRAWINGS

The foregoing and other objects, features and advantages of the present invention will be made apparent from the following detailed description of the preferred embodiment of the invention and from the drawings, in which:

FIG. 1 is an exploded perspective of the mounting assembly of the present invention as it is used with a display screen to be installed within a dashboard;

FIG. 2 is a perspective view of the mounting bracket according to the present invention;

DETAILED DESCRIPTION OF THE DRAWINGS

Figure 3:
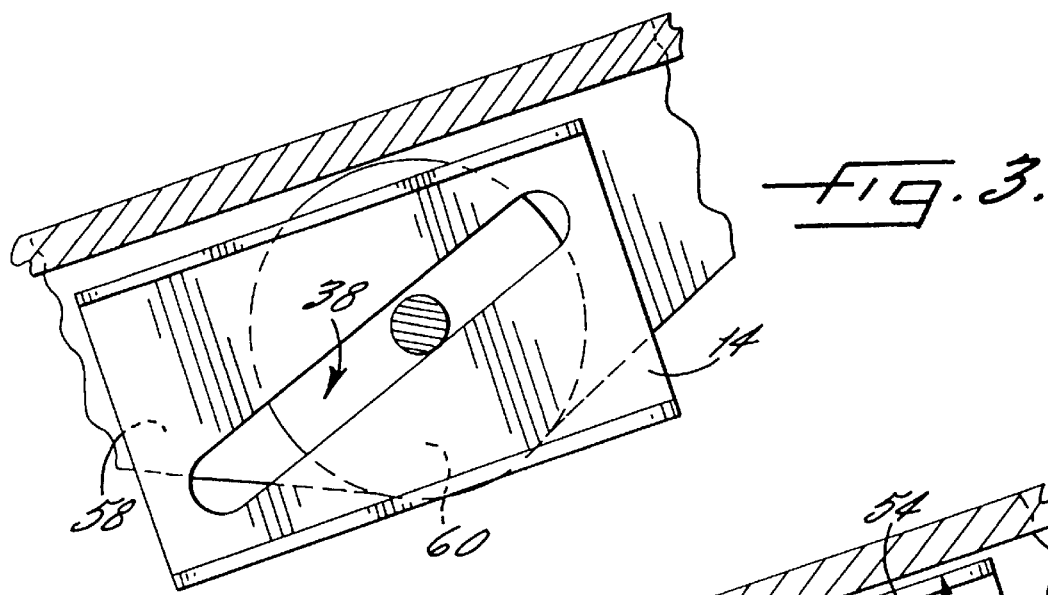
FIG. 3 a plan view of the mounting bracket according to the present invention in a first assembling position

The present invention will now be described more fully in detail with reference to the accompanying drawings, in which the preferred embodiments of the invention are shown. This invention should not, however, be construed as limited to the embodiments set forth herein. Rather, they are provided so that this disclosure will be thorough and complete and will fully convey the scope of the invention to those skilled in the art.

An exploded view of a display panel 10, instrument panel or dashboard 12, and first and second mounting brackets 14 and 16, respectively, are shown in FIG. 1. In the illustrated embodiment, the display screen possesses apertures 18 defined on opposite sides thereof to assist in mounting the display screen 10 within a correspondingly sized and configured aperture 20 defined by the dashboard or instrument panel 12. The assembly of the display screen 10, dashboard 12, and mounting brackets 14 and 16, in terms of their relative positions, are illustrated by the dotted lines shown in FIG. 1.

Also shown in FIG. 1 are first and second connectors 22 and 24, respectively. Each of the connectors 22 and 24 includes a shank portion 26 and 28, respectively, as well as a head portion 30 and 32, respectively. In a preferred embodiment, the shank portions 26 and 28 are threaded connectors. Moreover, in the embodiment as illustrated in FIG. 1, first and second annular spacers 34 and 36, respectively, are also provided. In one embodiment, the annular spacers 34 and 36 are washers and, more preferably, lock washers.

The mounting brackets 14 and 16 will now be described in detail with particular reference to FIG. 2. FIG. 2 illustrates a mounting bracket, such as mounting bracket 14, which secures the display screen 10 within the aperture 20 of the dashboard 12. It is to be understood that the mounting bracket 16 operates similarly to the bracket 14 except that it is positioned such that the orientation of the slot therein is reversed as shown in FIG. 1 and as described below.

Slots 38 and 40 are defined by mounting brackets 14 and 16, respectively. The slot 38 shown in FIG. 2 is illustrated as having substantially linear sides with rounded ends and is slanted upward. Although this is the configuration of a preferred embodiment, other configurations may be employed without departing from the spirit and scope of the present invention.

In the illustrated embodiment, each mounting bracket 14 and 16 includes a first flange 42 extending along a side portion of the mounting bracket and positioned against the rear side of the dashboard 12, and a second flange 44 which is positioned opposite the first flange 42. However, the flange need not include flanged side portions, but can, instead, be substantially flat or planar without departing from the spirit and scope of the present invention. The slot 38 defined within the first mounting bracket 14 divides the mounting bracket into a first region 46 located between the slot and the flange 42 and a second region 48 positioned between the slot 38 and the second flange 44. The slot 40 defined within the mounting bracket 16 likewise divides mounting bracket 16 between a first region 50 positioned between the flange 42 and the slot 40 and a second region 52 positioned between the slot 40 and the flange 44.

The first regions 46 and 50 of the respective brackets 14 and 16 therefore have a predetermined shape which tapers in a first direction from a first narrow portion indicated generally at 54 to a second broad portion indicated generally at 56. This configuration, thus, presents a wedge formation defined between the slots 38 and 40 and the flanges 42 positioned adjacent the rear side of the dashboard 12.

Thus, as illustrated in FIG. 2, when the various parts are assembled, the mounting brackets are preferably positioned relative to the respective apertures defined by the display screen such that the slots defined by the mounting brackets are aligned with the respective apertures defined by the display screen. The shank portions 26 and 28 of the first and second connectors 22 and 24 are then extended through the respective slots 38 and 40 and into the respective display screen aperture 18. Accordingly, the shank portions 26 and 28 have a diameter or cross-sectional width which is smaller than the width of the respective slot 38 and 40. Of course, in a preferred embodiment, the head portions 30 and 32, as well as the annular spacers 34 and 36 have a width greater than the width of the slots 38 and 40.

The sequential operation of the mounting brackets 14 and 16 will now be described in detail with particular reference to FIGS. 3-5. To mount the display screen within the opening defined in the dashboard, the display screen 10 is placed within the aperture 20 of the dashboard 12 such that, in a preferred embodiment, the threaded apertures 18 defined by the display screen open a substantial distance behind (or below) the rear side of the dashboard 12. The mounting brackets 14 and 16 are then positioned with flange 42 against the rear surface of the dashboard 12 and with their flat surfaces 58 against a side portion 60 of the display screen 10. Furthermore, the mounting brackets are positioned such that the slots 38 and 40 are in substantial alignment with the respective aperture 18 of the display screen 10.

Figure 4:
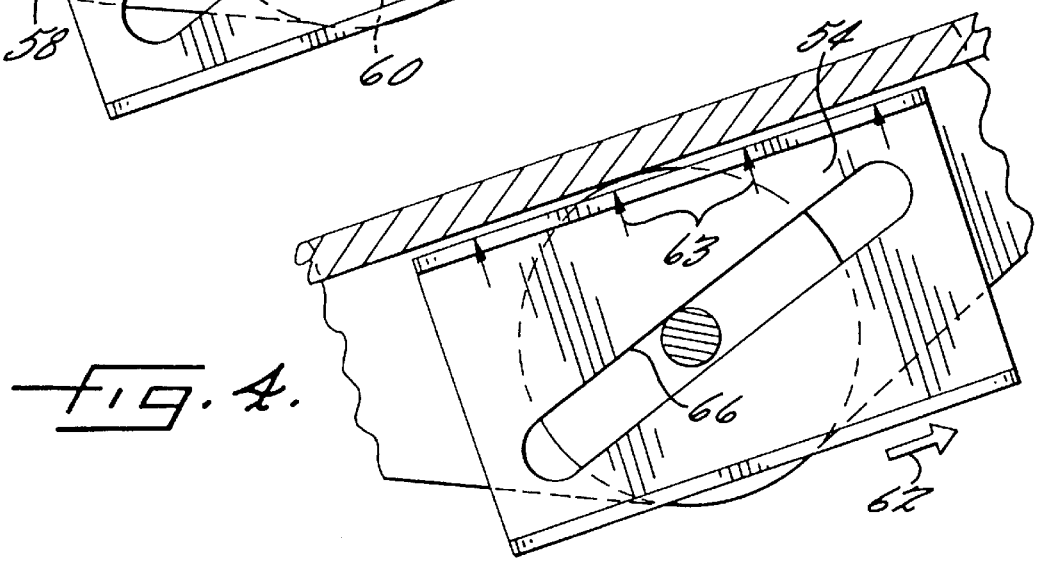
FIG. 4 is a plan view of the mounting bracket according to the present invention illustrating a second assembling position.
Figure 5:
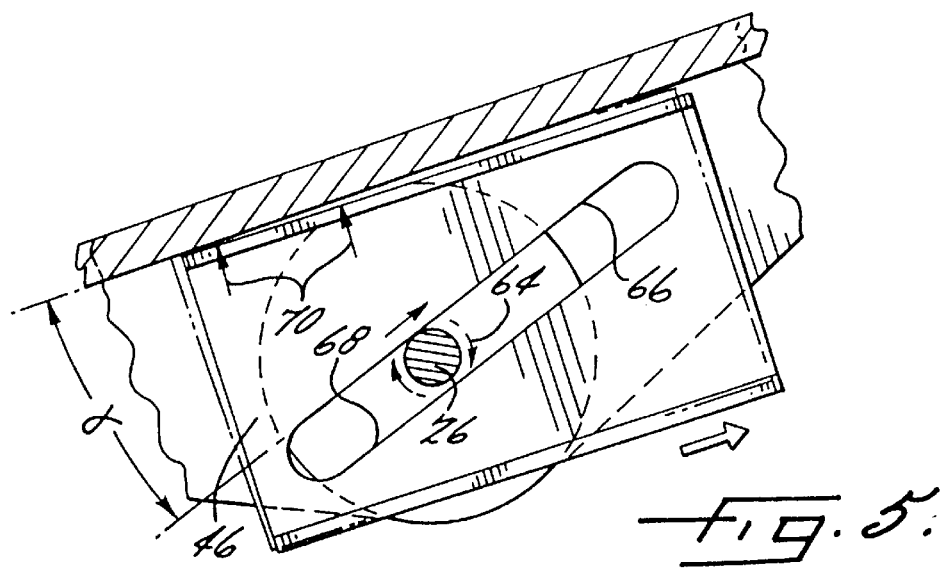
FIG. 5 is a plan view of the mounting bracket of the present invention in a third assembly position following Notation of the connector.

Shown in FIGS. 3-5 is a first mounting bracket 14 which, in a preferred embodiment, would be positioned on the right side of the assembly. However, similar assembly operations would be performed to mount a mounting bracket to any other side of the display screen. FIG. 3 illustrates a first position of the mounting bracket 14 during the assembly of the display screen 10 to the dashboard 12. Initially, the display screen 10 will be positioned within the aperture 20 of the dashboard 12. Then, the mounting bracket 14 will be positioned with its flat surface 58 against the side portion 60 of the display screen 10 so that the slot 38 is located in substantial alignment with the aperture of the display screen 10. The shank 26 of the first connector 22 can then be positioned to extend through the slot 38 and into the aperture 18 of the display screen as shown in FIG. 3.

As illustrated in FIG. 4, in a preferred embodiment, the bracket may be moved forward in the direction indicated by the arrow 62 such that the flange 42 abuts the rear side of the dashboard 12 as indicated generally at arrows 63. Typically, the bracket is moved by hand. However, the bracket can be moved in other manners without departing from the spirit and scope of the present invention. Thus, a larger portion of the first region 50 of the mounting bracket 14 is disposed between the first connector and the rear side of the dashboard 12. Accordingly, the flange 42 will be in substantial contact with the rear side of the dashboard 12. As illustrated in FIG. 4 and described above, the shank 26 of the first connector 22 is smaller in width than the width of the slot 38. Thus, as the mounting bracket is moved in the direction of arrow 62, the shank 26 is moved into contact with only one side 66 of the slot which, in the preferred embodiment, is the side of the slot closest to the dashboard 12, hereinafter referred to as the first side of the slot.

To firmly secure the display screen 10 within the dashboard 12, the head 30 of the first connector 22 is thereafter rotated in a first rotational direction indicated generally at arrow 64 shown in FIG. 5. The rotation of the head 30 of the first connector 22 thereby rotates the shank portion 28 also in the first rotational direction 64. Because the shank portion 26 is in contact with the first side 66 of the slot 38 and because the head of the first connector and/or the annular spacer 34 contacts a greater portion of the first region 46 than the second region 48, disparate frictional forces are applied to the regions of the mounting bracket on opposite sides 66 and 68 of the slot. In particular, rotation of the connector typically applies greater frictional forces to the first region of the mounting bracket than the second region.

More specifically, as indicated by the arrow 70, an upward force is applied to the first side 66 of the slot 38 closest to the dashboard 12. In addition, the frictional forces produced upon the rotation of the connector between the shank 28 and the first side 66 of the slot and between the head 30 and/or the annular spacer 34 and the planar or flat portion of the mounting bracket 14 further push the mounting bracket 14 in the direction of the arrow 62.

As shown in FIG. 5, this result is achieved, at least in part, because no frictional forces are applied to the side 68 of the slot 38 opposite the first side 66 while frictional forces are imparted to the first side and, therefore, the first region of the slot. In addition, the head of the first connector and/or the annular spacer contacts a greater portion of the first region of the mounting bracket than the second region such that rotation of the connector provides greater frictional forces to the first region than the second region. As will be apparent from FIG. 5, the frictional forces generated by rotation of the connector include a component extending in the direction of arrow 62. These frictional forces thereby force the mounting bracket 14 against the rear side of the dashboard 12 as indicated by the arrows 70 and in the direction of arrow 62. Thus, as the mounting bracket 14 is moved in the direction of arrow 70 and also in the direction of arrow 62, the display screen 10 is pulled more securely within the aperture 20 of the dashboard 12. This result is achieved because a larger wedge provided by the first region 46 of the mounting bracket 14 is forced between the first connector 22 and the rear side of the dashboard 12.

FIGS. 3–5 illustrate a first mounting bracket 14, but, the second mounting bracket 16 operates in a similar fashion. As shown in FIG. 1, however, the second mounting bracket 16 is positioned such that the slot 40 extends in the direction opposite that of slot 38 in the first mounting bracket 14. Therefore, when the second connector 24 is rotated in the same relative direction as the first connector 22, i.e., in a preferred embodiment in a clockwise direction, it, too, will produce forces along one side 72 of the slot 40 so that a wider portion of the first region 50 of the second mounting bracket 16 is forced between the rear side of the dashboard 12 and the slot 40.

In a preferred embodiment, two mounting brackets on opposing sides of the display panel are provided as shown in FIG. 1. However, it is within the purview of this invention that more or less mounting brackets may be provided and, indeed, may be positioned in different locations along the display screen 10. It is also within the purview of this invention to install any type of instrument within an instrument panel, and this invention is, therefore, not limited to the installation of a display screen or to the installation of an instrument within the dashboard of a boat.

Figure 6:
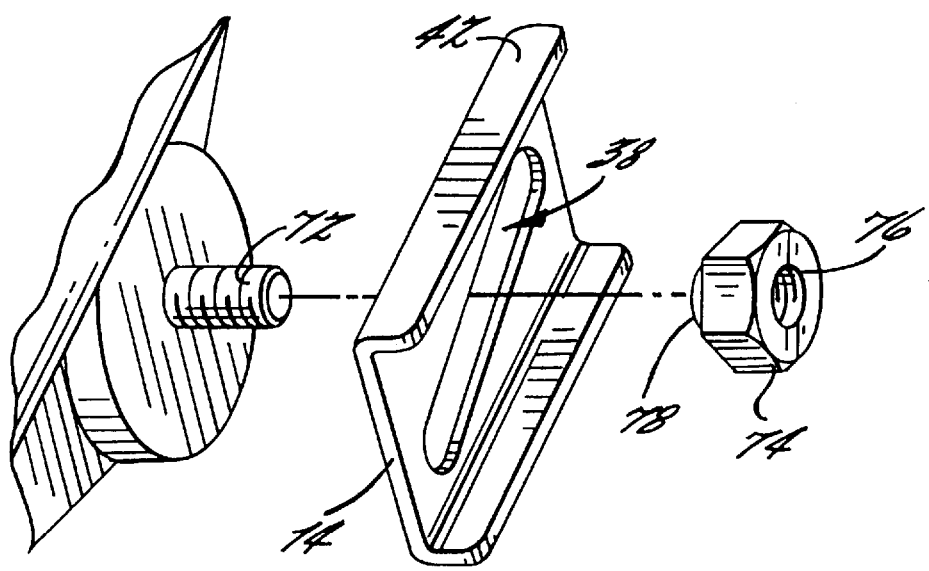
FIG. 6 is a plan view of the mounting bracket according to another embodiment of the present invention.

By way of example, FIG. 6 illustrates an alternative embodiment of the present invention. The display screen 10 includes outwardly extending posts 72 on opposing sides thereof (one of which is shown). In a preferred alternative embodiment, the posts 72 are threaded. Connecting members 74 with a head portion 76 and shank portion 78 engage the post 72 of the display screen 10. In a preferred alternative embodiment, the shank portions 78 are internally threaded to threadably engage the posts 72 while having a relatively smooth exterior surface.

As described above in conjunction with the connectors, the diameter or width of the shank portion 78 is smaller than the width of the slot 38 such that the shank portion can preferentially contact a first side of the slot, thereby forcing the bracket against the rear side of the dashboard 12 and pulling the display panel 10 within the aperture 20 as the connecting member is rotated. Therefore, the detailed operations of the mounting bracket of this embodiment are similar to that described in connection with the embodiment of FIGS. 1–5.

While particular embodiments of the invention have been described, it will be understood, of course, that the invention is not limited thereto, since modifications may be made by those skilled in the art, particularly in light of the foregoing teachings. It is, therefore, contemplated by the appended claims to cover any such modifications that incorporate those features of these improvements in the true spirit and scope of the invention.

That which is claimed is:

1. A dash instrument mounting assembly comprising:

a dashboard defining an aperture;

a dashboard instrument disposed at least partially within the aperture defined by the dashboard, wherein a portion of the dash instrument on a rear side of the dashboard defines first and second apertures;

first and second mounting brackets disposed adjacent a rear side of the dashboard, wherein each mounting bracket defines a respective slot which extends between first and second sides to thereby define a predetermined width, and regions by the respective slot, the first region of each mounting bracket disposed between the respective slot and the rear side of the dashboard and having a predetermined shape which tapers in a first direction from a second broad portion to a first narrow portion; and first and second rotatable connectors having respective head portions and shank portions, wherein the shank portions of each connector extend through the slot defined by the respective mounting bracket for engaging a respective aperture defined by the dash instrument, wherein the shank portion of each rotatable connector contacts only the first side of the respective slot, and wherein said first and second rotatable connectors can be rotated in a first rotational direction for moving said first and second mounting brackets in the respective first directions relative to the dashboard and relative to the dash disposed between the respective connector and the rear side of the dashboard, thereby drawing the dash instrument into the corresponding aperture defined by the dashboard.

2. A dash instrument mounting assembly according to claim 1 wherein said shank portions are threaded for engaging respective apertures of the dash instrument.

3. A dash instrument mounting assembly according to claim 1 wherein each mounting bracket is positioned relative to the corresponding aperture defined by the dashboard such that the shank portion of said connector abuts and frictionally engages a first side of the slot to thereby create a frictional force differential is applied between the first and second regions of the mounting bracket as the respective connector is rotated.

4. A dash instrument mounting assembly according to claim 3 wherein the first side of said slot is adjacent and defines an edge portion of the first region of the respective mounting bracket such that greater frictional force is applied to the first region than the second region as the respective connector is rotated.

5. A dash instrument mounting assembly according to claim 4 wherein the rotation of each connector in the first rotational direction imparts a frictional force to a first side of the slot which includes a component extending in the respective first direction, thereby moving said bracket in the respective first direction.

6. A method of mounting an instrument within a corresponding aperture of an instrument panel with at least a first mounting bracket defining a slot therein and having a first portion, defined at least partially by the slot, that tapers in a first direction from a broad portion to a narrow portion, the method comprising the steps of:

positioning the mounting bracket on a rear side of the instrument panel such that said slot is in substantial alignment with a corresponding aperture of the instrument and adjacent the rear side of the instrument panel;

extending a connector member through the slot defined by the mounting bracket and into the aperture defined by the instrument such that the connector member abuts and frictionally engages a first side of the slot adjacent the first region; and driving said mounting bracket in a direction towards its broad portion by rotating the connector member within the slot such that the mounting bracket is moved in the first direction relative to the instrument and relative to the instrument panel.

7. The method according to claim 6 further comprising the steps of:

positioning a second mounting bracket on a rear side of the instrument panel and on a side of the instrument opposing the first mounting bracket wherein the second mounting bracket also includes a first portion which tapers in a first direction from a narrow portion to a broad portion and which is defined at least partially by a slot defined by the second mounting bracket, and wherein said positioning step comprises the step of positioning the second mounting bracket such that the slot is in substantial alignment with a corresponding aperture of the instrument and such that the first portion of the mounting bracket is adjacent the rear side of the instrument panel;

extending a second connector member to extend through the slot defined by the second mounting bracket and the aperture defined by the instrument such that the connector member abuts and frictionally engages a first side of the slot adjacent the first region; and driving said mounting bracket in the first direction towards its broad portion by rotating the second connector member within the slot.

8. A method according to claim 6 wherein said driving step comprises the step of rotating the connector member in a first rotational direction, and wherein said rotating step comprises the step of imparting frictional force to the first side of the slot which includes a component extending in the first direction such that the mounting bracket is thereby driven in the first direction.

9. A method according to claim 6 wherein the mounting bracket also comprises a second region defined at least partially by a second side of the slot, opposite the first side, and wherein said driving step comprises the step of applying a greater frictional force to the first region of the mounting bracket than the second region of the mounting bracket.

* * * * *

UNITED STATES PATENT AND TRADEMARK OFFICE
CERTIFICATE OF CORRECTION

PATENT NO. : 5,865,403
DATED : February 2, 1999
INVENTOR(S) : Covell It is certified that error appears in the above-identified patent and that said Letters Patent is hereby corrected as shown below:

Column 3, line 20 "Notation" should read --rotation--.

Column 6, line 60, after "and" insert --wherein each mounting bracket is divided into first and second--.

Column 7, line 5, after "connector" insert --has a width less than the predetermined width of the respective slot such that the shank portion of each rotatable connector--; line 10, after "dash" insert --instrument such that a broader portion of each first region is--; line 46, after "and" insert --such that the first portion of the mounting bracket is--.

Signed and Sealed this

Fifteenth Day of June, 1999

Q. TODD DICKINSON

*Attest:*

*Attesting Officer*       Acting Commissioner of Patents and Trademarks